United States Patent [19]

Kopkie et al.

[11] Patent Number: 4,923,342
[45] Date of Patent: May 8, 1990

[54] TOOL FOR CUTTING A KEYSLOT IN A WORKPIECE BORE

[75] Inventors: Harold D. Kopkie, 27331 N.E. 69th Ave., Battle Ground, Wash. 98604; Delbert D. Homola, Brush Prairie, Wash.

[73] Assignee: Harold D. Kopkie, Battle Ground, Wash.

[21] Appl. No.: 321,629

[22] Filed: Mar. 8, 1989

[51] Int. Cl.<sup>5</sup> ............................................. B23C 3/30
[52] U.S. Cl. ................................... 409/143; 409/177
[58] Field of Search ............... 409/143, 177, 236, 234, 409/135, 136, 144, 204

[56] References Cited

U.S. PATENT DOCUMENTS

| | | | |
|---|---|---|---|
| 795,420 | 7/1905 | Schellenbach | 409/143 |
| 1,026,004 | 5/1912 | Strafer | 409/143 |
| 1,735,841 | 11/1929 | Von Neudeck | 409/143 |
| 2,352,888 | 7/1944 | Dettloff | 409/177 |
| 2,475,227 | 7/1949 | Evans | 409/143 |

FOREIGN PATENT DOCUMENTS 232810 11/1985 Japan ................................. 409/177

OTHER PUBLICATIONS

National Machine Tool Company Catalog No. 18.

Primary Examiner—Daniel Howell
Attorney, Agent, or Firm—Marger & Johnson

[57] ABSTRACT

A tool for cutting a keyslot in a workpiece bore for use with a numerically-controlled (N.C.) machine of the type having a plurality of tools for performing a number of machining operations on a workpiece. The tool includes a spindle which is insertable in the driving mechanism of the N.C. machine and a shaft fixed to the spindle for driving a cutter wheel responsive to spindle rotation. The spindle is received in a housing which is automatically locked against rotation relative thereto when the tool is not in the driving mechanism of the N.C. machine. An adjustable ring permits changing the cutting plane of the cutter wheel to vary the angle at which the keyslot is cut in the workpiece bore.

27 Claims, 5 Drawing Sheets

TOOL FOR CUTTING A KEYSLOT IN A WORKPIECE BORE

BACKGROUND OF THE INVENTION

1. Field of the Invention

The present invention relates to a tool for cutting a keyslot in a workpiece bore and more particularly to such a tool which is usable with an automatic metal machining device of the type having a plurality of tools for performing a number of machining operations on a workpiece.

2. Description of the Related Art

Tools for cutting a keyslot on the radially inner surface of a workpiece bore are known in the art. The term "keyslot" as used herein refers to any slot or groove formed on the radially inner surface of a bore whether the groove or slot is used to accommodate a key or for other purposes such as to provide a channel for lubricant or to accommodate a splined connection.

Some such prior art tools are illustrated in National Machine Tool Company Catalog No. 18. Tools illustrated therein include a cutter wheel turned in response to rotation of a shaft. The tool is designed to be used with a drill press which turns the shaft thereby rotating the cutter wheel. When the tool is inserted in a workpiece bore and the cutter wheel bears against the radially inner surface of the bore, a slot or groove is formed.

Such prior art tools are not usable with state of the art numerically-controlled (N.C.) machines which are programmable to drive a plurality of tools for automatically machining a workpiece. Such machines include a carriage for storing a plurality of machining tools and a driving mechanism into which different ones of the tools are automatically inserted by the machine for performing machining operations on a workpiece which is releasably secured to the machine.

Each such tool is mounted on a drive spindle having a taper and a tension stud on one end thereof which is receivable into and cooperates with the driving mechanism for imparting rotary motion to the tool. The machine can thus be programmed to perform a number of different machining operations, such as boring and milling, in a predetermined sequence.

While such N.C. machines adequately perform the various machining functions, none of the presently available tools for use with such machines can cut a keyslot in the workpiece bore. Thus, when the design of a machined part calls for such keyslot, the workpiece must be removed from the N.C. machine and placed on a different machine, such as a broaching machine or a drill press having a miller like that shown in the National Machine Tool catalog.

It would be desirable to have a spindle-mounted tool usable with such a machine for cutting a keyslot in a workpiece bore. Such a tool would eliminate the need to transfer the workpiece to a separate machine for manually cutting a keyslot and would permit the keyslot to be cut as part of the computer-controlled operation of the workpiece machining.

SUMMARY OF THE INVENTION

The present invention comprises a tool for cutting a keyslot in a workpiece bore and includes a spindle rotatable about the longitudinal axis thereof. A cutter wheel is mounted on a cutter wheel housing and extends therefrom for cutting a workpiece. Means are provided for connecting one end of a shaft to the spindle for rotating the shaft responsive to spindle rotation. Means for translating shaft rotation to cutter wheel rotation are operatively disposed between the shaft and the cutter wheel.

It is a general object of the present invention to provide a tool for cutting a keyslot in a workpiece bore which is usable in connection with an automatic machining device of the type having a plurality of tools for performing a number of machining operations on a workpiece.

It is another object of the present invention to provide such a tool which is mounted on a spindle for imparting rotary motion to the tool.

It is yet another object of the present invention to provide such a tool having means for selecting the cutting plane of the cutting wheel.

It is still another object of the invention to provide such a tool which automatically locks the cutter wheel orientation relative to the spindle when the tool is removed from an automatic machining device.

The foregoing and other objects, features and advantages of the invention will become more readily apparent from the following detailed description of a preferred embodiment which proceeds with reference to the drawings.

DETAILED DESCRIPTION

Figure 1:
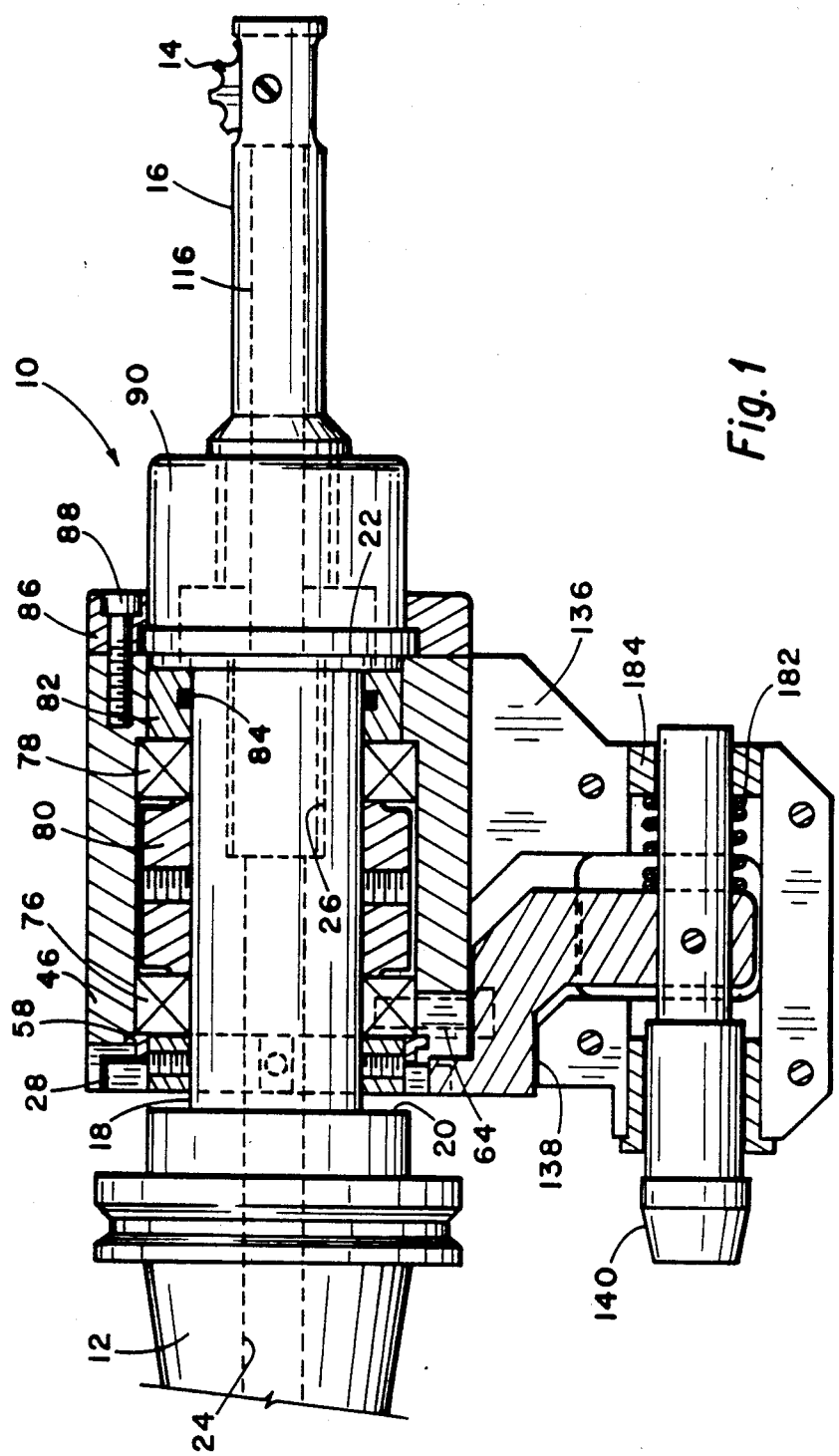
FIG. 1 is a sectional view of an assembled tool constructed in accordance with the present invention.

Indicated generally at 10 is a tool constructed in accordance with the present invention. Included therein is a main drive spindle 12, a portion of which on the left is not shown, and a cutter wheel 14 mounted on a cutter wheel housing 16. Cutter wheel housing 16 is also referred to herein as a shaft housing.

Generally speaking, the leftmost portion (not visible) of spindle 12, which includes a conventional tension stud on the left end thereof, is engageable with the driving mechanism of a commercially-available, numerically-controlled (N.C.) machining device (not shown). A number of conventional tools are engageable with the driving mechanism of the machining device via spindles similar to spindle 12. The machining device is capable of automatically inserting a preselected tool, such as tool 10, into its driving mechanism which can impart rotary, radial and axial motion to the spindle to effect machine operations on a workpiece (not shown) which is releasably mounted on the machining device. The present invention provides a means for such an N.C. machining device to machine a keyslot on the radially inner surface of a bore formed in a workpiece.

Considering now in more detail the structure of the components from which tool 10 is assembled, spindle 12 includes a radially-outer cylindrical surface 18 which extends between a shoulder 20 and an end 22 of the spindle. That portion of the spindle between shoulder 20 and end 22 is referred to herein as a driving end. The end (not shown) of spindle 12 which is engageable with an N.C. machining device is referred to herein as a driven end.

A coaxial bore 24 is provided for circulating coolant from the machining device to cutter wheel 14 in a manner which will be hereinafter described. A counterbore 26 has one end in communication with bore 24 and the other end in communication with end 22 of the spindle.

Figure 2:
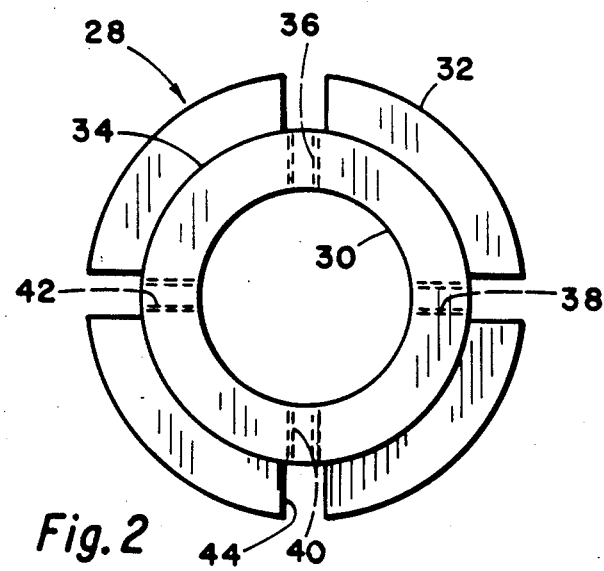
FIG. 2 is a right end elevation view of an end plate incorporated in the tool of FIG. 1.
Figure 3:
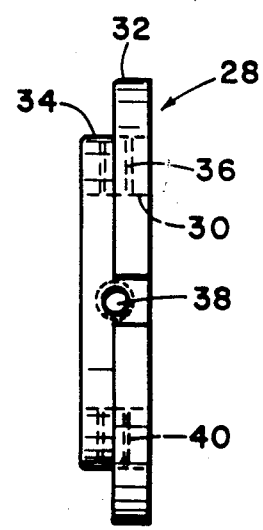
FIG. 3 is a side elevation view of the end plate of FIG. 2.

An end plate 28 is illustrated in more detail in FIGS. 2 and 3. The end plate comprises a circular plate, a bore 30 therethrough, a radially-outer surface 32, and a shoulder 34. Threaded radial bores 36, 38, 40, 42 are formed in end plate 28. Each bore is adjacent a radial slot, like bore 40 is adjacent slot 44. Each slot provides access to its associated threaded bore to permit a set screw to threadably engage the bore and thereafter tighten against surface 18 on spindle 12, thereby fixing the end plate relative to the spindle. As will later be more fully explained, one of the slots cooperates with a locking mechanism to prevent spindle rotation.

Figure 5:
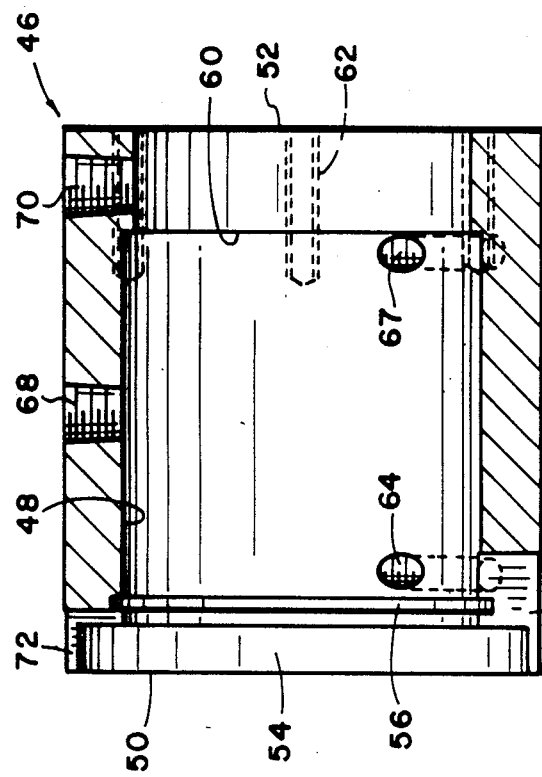
FIG. 5 is a side elevation view of the housing of FIG. 4.
Figure 4:
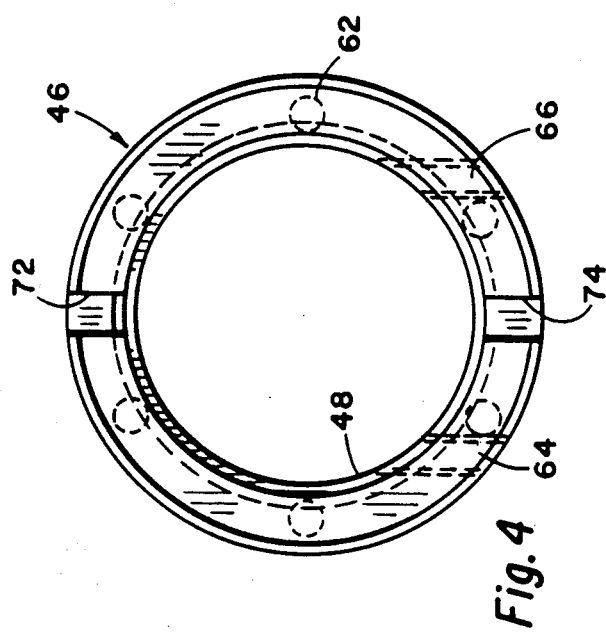
FIG. 4 is a left end elevation view of a housing incorporated in the tool of FIG. 1.

Returning again to FIG. 1, spindle 12 is coaxially received within a spindle housing 46 which is illustrated in more detail in FIGS. 4 and 5. Spindle housing 46 includes a substantially cylindrical opening or bore 48 therethrough. The spindle housing includes a first end 50 and a second end 52. Spindle housing 46 includes therein a counterbore 54, which receives a portion of end plate 28 in FIG. 1. Also included in housing 46 is a snap ring groove 56 which accommodates a snap ring 58 (in FIG. 1) and a shoulder 60 formed on the radially inner surface of bore 48. Six axial threaded bores, one of which is threaded bore 62, are formed in end 52 of the spindle housing. These six bores, like bore 62, accommodate bolts for securing the spindle housing to another part of the tool as will hereinafter be more fully described. Four vertical threaded bores, three of which are bores 64, 66, 67, are formed in the lower portion of spindle housing 46 and also serve to accommodate bolts for bolting the spindle housing to another component of the tool as will hereinafter be more fully described.

A pair of threaded radial bores 68, 70 are formed in the uppermost portion of the spindle housing. A radial slot 72 is formed in end 50 of the spindle housing at the uppermost portion thereof. Slot 72 accommodates an Allen wrench to enable tightening of set screws in the radial bores, like bore 36 of end piece 28, against surface 18 of the spindle.

A second radial slot 74 is formed in end 54 opposite slot 72 and accommodates a locking member key as will hereinafter be more fully explained. Directing attention once again to FIG. 1, bearings 76, 78, such being also referred to herein as bearing means, are interposed between surface 18 of spindle 12 and bore 48 in spindle housing 46. Bearings 76, 78 accommodate rotation of spindle 12 relative to housing 46. Spacer means or an annular spacer 80 is disposed about the circumference of spindle 12 and is secured thereto via set screws (not shown) which are threadably engaged with opposing bores as shown in spacer 80 and which are urgeable against the spindle to secure the spacer. The set screws are insertable and tightenable through bore 68 in housing 46. After insertion and tightening of the set screws, a plug (not shown) is threadably engaged with bore 68 to seal the bearings from the environment.

An annular ring 82 is press fit into end 52 of spacer housing 46 as shown. A radially inner groove formed on ring 82 contains an O-ring 84 which seals about the circumference of spindle 12 for a purpose which will hereinafter be described. Ring 82 and O-ring 84 are referred to herein as sealing means.

An adjustment ring 86 is secured to end 52 of housing 46 via six bolts, like bolt 88, which are received in six axial bores disposed about the circumference of ring 86. The six bores are engaged with the six threaded bores, like bore 62, in end 52 of the housing.

Ring 86 releasably secures a nose piece 90 to end 52 of housing 46. Nose piece 90 is illustrated in more detail in FIGS. 6 and 7.

Figure 6:
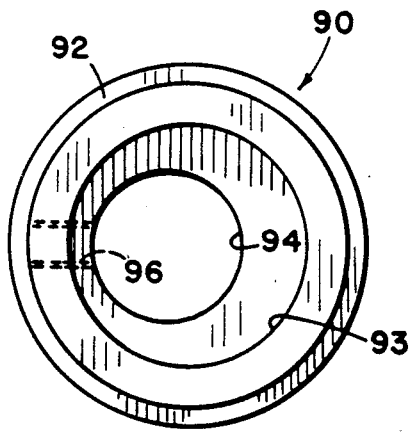
FIG. 6 is a left end elevation view of a nose piece incorporated in the tool of FIG. 1.
Figure 7:
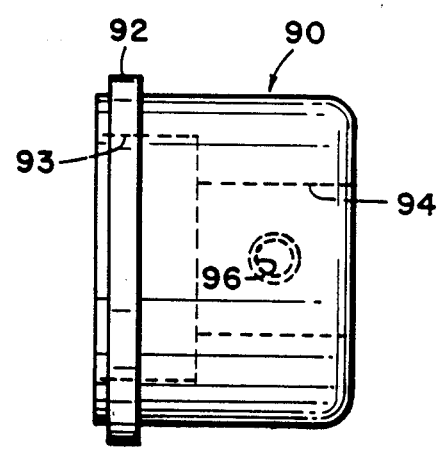
FIG. 7 is a side elevation view of the nose piece of FIG. 6.

In FIGS. 6 and 7, nose piece 90 includes an annular shoulder 92 about the circumference thereof. As can be viewed in FIG. 1, a complementary shoulder on the radially inner surface of ring 86 abuts against shoulder 90 and clamps the same between the ring and end 52 of housing 46. A coaxial counterbore 93 is formed in the end of nose piece 90 adjacent housing 46. A bore 94 having an axis offset with respect to counterbore 93 communicates between the right side, as viewed in FIG. 7, of nose piece 90 and bore 93. A threaded radial bore 96 accommodates a set screw for fixing nose piece 90 to cutter wheel housing 16.

Figure 8:
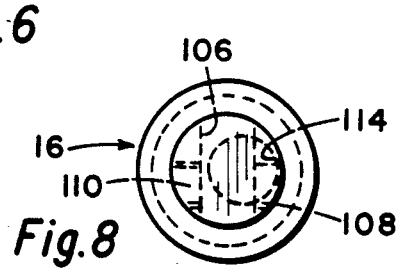
FIG. 8 is a right end elevation view of a cutter housing (without the cutter wheel) of the tool of FIG. 1.
Figure 9:
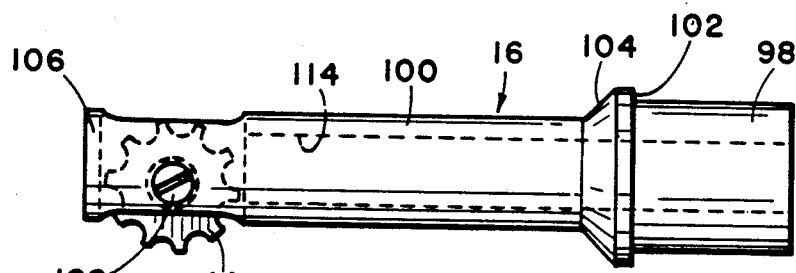
FIG. 9 is a side elevation view of a cutter housing of FIG. 8 with the cutter wheel oriented downwardly.
Figure 10:
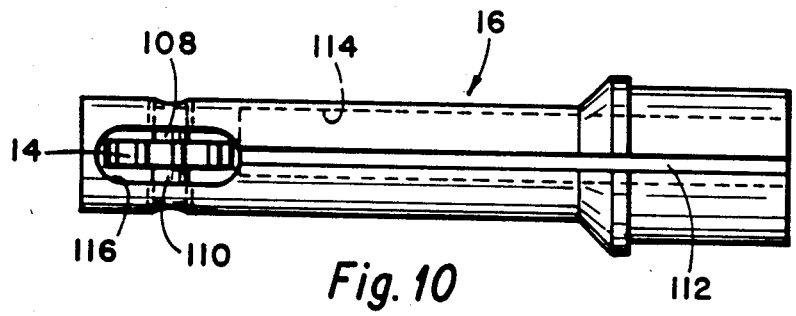
FIG. 10 is a bottom plan view of the housing and cutter wheel of FIG. 9.

Attention is directed to FIGS. 8-10 for a more detailed description of the structure of cutter wheel housing 16. Housing 16 comprises a generally cylindrical element having an enlarged cylindrical end portion 98 and a cylindrical body portion 100 which is somewhat less in diameter than end portion 98. A shoulder 102 in combination with a tapered portion 104 separate body portion 100 and end portion 98. A slot 106 extends through body portion 100 and receives cutter wheel 14 therein. A pair of opposing screws 108, 110 are received in threaded radial bores formed in body portion 100. Wheel 14 is rotatably journaled on screws 108, 110 about the axes thereof. A pair of opposing axial grooves, one of which is groove 112, are formed on the radially outer surface of housing 16 180° apart. As will later be more fully explained herein, these opposing grooves communicate coolant to cutter wheel 14 during the keyslot cutting process.

A bore 114 is formed in the right end, as viewed in FIGS. 9 and 10, of housing 16 and communicates with slot 106. As best viewed in FIGS. 8 and 10, the axis of bore 114 is eccentric with respect to the axes of body and end portions 100, 98.

Figure 12:
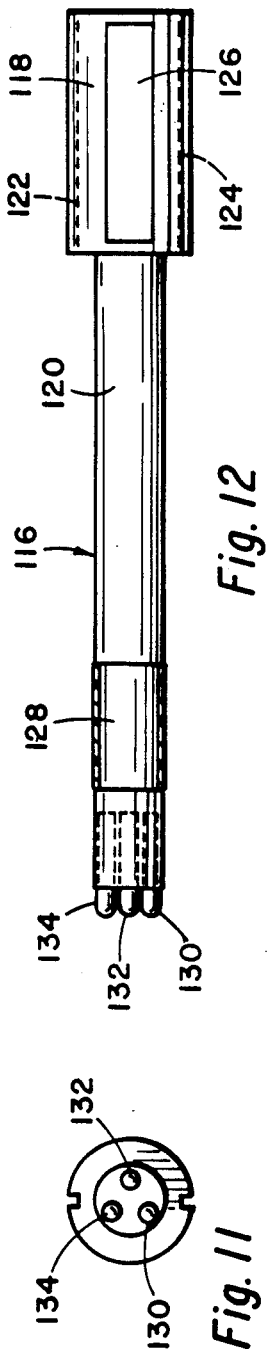
FIG. 12 is a side view of the shaft of FIG. 11.
Figure 11:
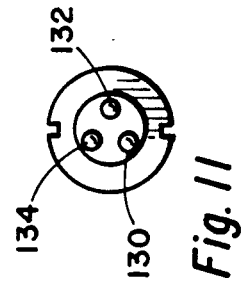
FIG. 11 is a right end elevation view of a shaft incorporated in the tool of FIG. 1.

A shaft 116, a portion thereof being shown received in bore 114 in FIG. 1, is illustrated in FIGS. 11 and 12.

Shaft 116 is generally cylindrical in shape and includes an enlarged end portion 118 and a cylindrical body portion 120 which is smaller in diameter than end portion 118. End portion 118 and body portion 120 are coaxial. The end portion includes a pair of opposing axial grooves 122, 124 which communicate coolant, in a manner which will hereinafter be described, to cutter wheel 14.

A flat surface 126 formed on portion 118 provides a suitable surface against which a set screw (not shown) engaged with a radial threaded bore (not visible in the view of FIG. 1) in spindle 12 locks the spindle and shaft 116 relative to one another. Such a set screw may be inserted and tightened through bore 70 of housing 46 (in FIG. 5). There is sufficient space between the right side of ring 82 and the leftmost end of nose piece 90 to permit a set screw to be inserted through bore 70 in housing 46 and engaged in the radial threaded spindle bore. The set screw is tightened against surface 126 on shaft 116 to secure the shaft to the spindle. After the set screw is so tightened, a threaded plug (not shown) is engaged and tightened in bore 70 to prevent leakage of coolant from spindle housing 46.

A reduced diameter portion 128 on body portion 120 accommodates a plastic bushing (not shown) which facilitates rotation of body portion 120 in bore 114 (in FIGS. 8-10) of housing 16. Three driving pins 130, 132, 134 extend from the end of body portion 120. When shaft 116 is inserted into bore 114 in shaft housing 16, pins 130, 132, 134 sequentially engage separate teeth on cutter wheel 14 thereby rotating the same responsive to rotation of shaft 116. Bore 114 (in FIG. 10) is eccentric with respect to the axis of housing 16 to permit pins 130, 132, 134 to so engage the teeth of cutter wheel 14.

Figure 14:
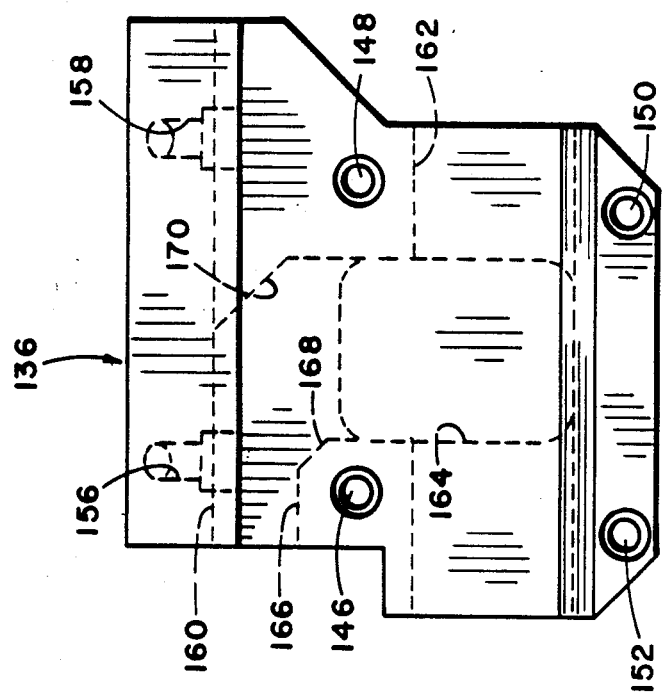
FIG. 14 is a side view of the lock housing of FIG. 13.
Figure 13:
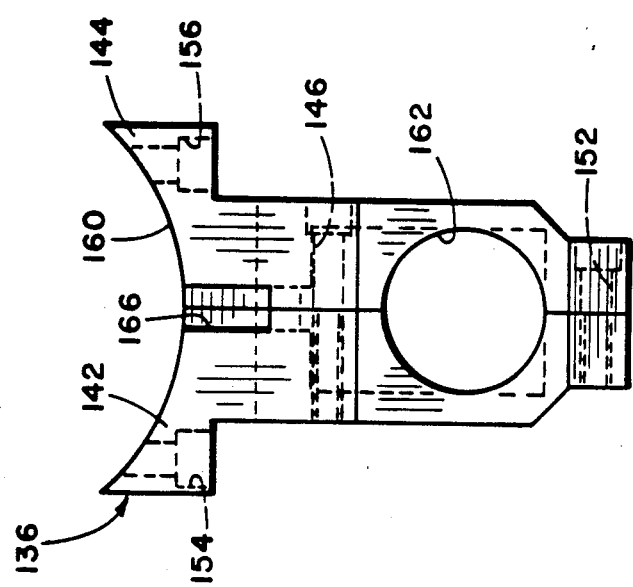
FIG. 13 is a left end view of two pieces, in assembled condition, which make up a lock housing incorporated in the tool of FIG. 1.

Returning again to FIG. 1, a lock housing 136 contains therein a locking member 138 and a substantially cylindrical locking member actuator 140. For a more detailed description of lock housing 136, attention is directed to FIGS. 13 and 14. Housing 136 comprises two substantially symmetrical halves 142, 144 which are bolted together via bolts inserted in bores 146, 148, 150, 152. Vertical bores 154, 156, 158 align with threaded bores 64, 66, 67, respectively, in the lower portion of housing 46. When so aligned, bolts are inserted into bores 154, 156, 158 to bolt the lock housing to spindle housing 46 as illustrated in FIG. 1. The upper portion of housing 136 defines a semi-cylindrical concave surface 160 against which the lower cylindrical portion of housing 46 is bolted as described above.

Figure 15:
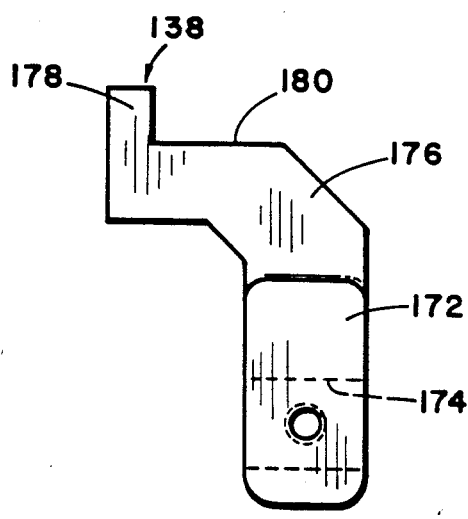
FIG. 15 is a side elevation view of a locking member incorporated in the tool of FIG. 1.
Figure 16:
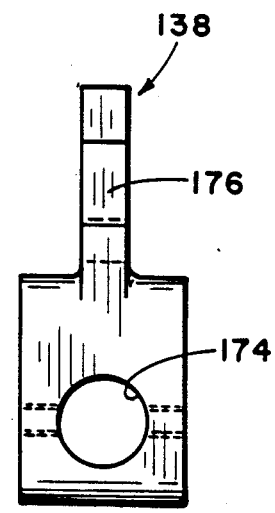
FIG. 16 is an end view of the locking member of FIG. 15.

Housing 136 includes a bore 162 therethrough in which actuator 140 is slidingly received. An opening 164 having a rectangular cross section is formed through housing 136 from side-to-side. A slot 166 extends from surface 160 to the upper portion of opening 164. The slot includes a pair of opposing internal walls 168, 170 (in FIG. 14). Slot 166 receives therein a portion of locking member 138 (in FIG. 1) which is shown in greater detail in FIGS. 15 and 16.

The locking member includes a lower portion 172 having a bore 174 therethrough. As can be seen in FIG. 1, bore 174 receives therein a portion of actuator 140 which is secured thereto via set screws (not shown) engaged with the threaded bores in portion 172 shown in FIG. 16. A substantially planar upper portion 176 of locking member 138 is received in slot 166. Upper portion 176 includes an upright key 178 which extends upwardly from surface 180 adjacent the key.

When the tool is assembled as illustrated in FIG. 1, surface 180 is parallel to and just beneath the lower portion of surface 160 on lock housing 136 and key 138 extends thereabove. In the configuration of FIG. 1, key 138 is received within slot 44 of end plate 28 (in FIG. 2) thereby preventing rotation of the spindle relative to the remainder of tool 10.

A spring 182, which is constrained between a bushing 184 and the right side of lower portion 172 of locking member 138, biases the locking member to the left thus tending to maintain the spindle in its locked condition. When actuator 140 is urged to the right, in a manner which will be hereinafter more fully explained, spring 182 compresses and locking member 138 moves rightwardly. Key 178 thus moves into slot 74 of spindle housing 46 (in FIG. 5) as it withdraws from slot 44 in end plate 28. The spindle is thus freed for rotation relative to housing 46.

In operation, the tool is assembled as shown in FIG. 1. As previously mentioned, tool 10 is designed for use with an N.C. machine (not shown) which utilizes a number of other tools similar to spindle 12. The machine is programmed and each tool is loaded into a pocket in the tool carriage which forms a part of the machine. A workpiece is releasably mounted on the machine in the usual manner.

Once the N.C. machine is started, it automatically selects various tools in a pattern determined by the programming and inserts each selected tool, in turn, into its driving mechanism. When tool 10 is selected and so inserted, the left end of actuator 140 abuts against a block (not shown) on the N.C. machine thereby urging locking member 138 to the right. The block on the N.C. machine includes a bore into which the leftmost end of actuator 140 is just received. Key 178 is thus withdrawn from slot 44 in end piece 28 and is received in slot 74 in spindle housing 46. With the left end of actuator 140 received in the block bore in the N.C. machine and key 138 received in slot 74 in the spindle housing, spindle 12 is free to rotate while key 178 in conjunction with actuator 140 prevents rotational movement of spindle housing 46.

At this stage, the N.C. machine imparts rotational movement to spindle 12. When the spindle rotates, shaft 116 also rotates since, as will be recalled, the shaft is fixed to spindle 12 by a set screw received in a threaded bore (not visible) in the spindle which is urged against flat surface 126 of the shaft. Cutter wheel housing 16 is fixed relative to nose piece 90 via a set screw (not shown) received in threaded bore 96 (in FIGS. 6 and 7) which is urged against that portion of housing 116 received in nose piece bore 94. Ring 86 fixedly clamps nose piece 90 against the rightmost end of housing 46. Thus, the housing, ring 86, the nose piece and cutter wheel housing 16 all remain stationary and fixed while spindle 12 and shaft 116 rotate.

Rotation of shaft 116 engages each of pins 130, 132, 134 (in FIG. 12) on the end of the shaft in turn with different sequential teeth in cutter wheel 14 thereby rotating the same. With the cutter wheel so rotating, spindle 12 is movable both axially and radially under control of the N.C. machine program to advance the rotating cutter wheel into the workpiece bore to cut a keyslot therein.

A conventional elongate slot is cut down one side of the bore by driving the tool into and out of the bore with cutter wheel 14 urged against the surface of the bore. A half-moon slot is cut by axial movement of spindle 12 into a bore and thereafter radial movement of the spindle thus urging the wheel against the bore wall. Thereafter the spindle first radially withdraws and then axially withdraws. Such action creates a single half-moon slot on the radially inner surface of a bore.

When cutter wheel 14 is rotating, coolant is supplied via bore 24, opposing grooves 122, 124 (in FIG. 12) on the end of shaft 116 and opposing grooves, one of which is groove 12 in FIG. 10, on housing 16. Coolant thus fills counterbore 93 of the nose piece and is provided from there via the opposing grooves, like groove 112, in the housing to cutter wheel 114. Since the coolant is under pressure, a pair of coolant streams on opposing sides of housing 16 pass immediately above and below slot 106 in which cutter wheel 14 is journaled. The coolant thus cools the cutter and workpiece and flushes debris away therefrom.

Each time the driving mechanism of the N.C. machine stops rotary motion of a spindle received therein, the spindle is in the same angular position as when it was first inserted into the driving mechanism. Thus, when the programmed action of tool 10 ends and rotary motion of spindle 12 stops, end plate 28 is again oriented with slot 44 directed downwardly. When the machine automatically disengages spindle 12 from the driving mechanism, spring 182 urges actuator 140 to the left, since the block no longer prevents such action, and thereby drives locking member 138 leftwardly. Such action drives key 138 from slot 74 in the lower portion of spindle housing 46 into slot 44 of end plate 28, thereby again locking the spindle relative to the spindle housing.

As illustrated in FIG. 1, cutter wheel housing 16 is positioned to cut a slot in the twelve o'clock position of a workpiece bore positioned to the right of the tool and coaxial therewith. Tool 10 is adjustable to select any angular orientation at which the keyslot may be cut. The angle is adjusted by loosening the six bolts, like bolt 88, which tightly secure ring 86 to end 52 of spindle housing 46 via engagement with six threaded bores, like bore 62 in the spindle housing end. With the bolts so loosened, nose piece 90 is rotatable relative to spindle housing 46.

As will be recalled, a set screw fixes cutter wheel housing 16 relative to the nose piece and rotation of the nose piece thus rotates housing 16 and thereby changes the cutting plane of cutter wheel 14. Eccentric bore 94 in nose piece 90 accommodates the eccentricity of shaft body portion 120 relative to the axis of cutter housing 16 and thus permits such rotation. When cutter wheel 14 assumes a desired angle relative to housing 46, the six bolts securing ring 86 are tightened thus fixing the nose piece, and therefore cutter wheel housing 16, relative to housing 46 in a new angular relation.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A tool for cutting a keyslot in a workpiece bore for use with an automatic machining device of the type having a plurality of tools for performing a number of machining operations on a workpiece, said apparatus comprising:

a spindle rotatable about the longitudinal axis thereof and being engageable with said machining device for so rotating said spindle;

a housing for said spindle, said spindle having an unlocked condition in which it is rotatable about the longitudinal axis thereof relative to said housing and a locked condition in which it is not rotatable;

a cutter wheel housing;

a cutter wheel mounted on said cutter wheel housing and extending therefrom for cutting a workpiece;

a shaft;

means for connecting one end of said shaft to said spindle for rotating said shaft responsive to spindle rotation;

means for translating shaft rotation to cutter wheel rotation operatively disposed between said shaft and said cutter wheel; and means for selecting a cutting plane of said cutting wheel relative to said spindle housing.

2. The tool of claim 1 wherein said selecting means comprises means for varying the relative positions of said cutter wheel housing and said spindle housing.

3. The tool of claim 2 wherein said housing includes a substantially cylindrical opening to accommodate said spindle and said varying means comprises a nose cap mountable on one end of said housing and having an opening therethrough to accommodate said cutter wheel housing.

4. The tool of claim 3 wherein said nose cap opening is eccentric relative to said spindle housing opening.

5. The tool of claim 4 wherein said nose cap is rotatable relative to said spindle housing and said apparatus further includes means for fixing the same at a plurality of different angular positions.

6. A tool for cutting a keyslot in a workpiece bore for use with an automatic machining device of the type having a plurality of tools for performing a number of machining operations on a workpiece, said apparatus comprising:

a spindle rotatable about the longitudinal axis thereof and being engageable with said machining device for so rotating said spindle;

a housing for said spindle, said spindle having an unlocked condition in which it is rotatable about the longitudinal axis thereof relative to said housing and a locked condition in which it is not rotatable;

a cutter wheel housing;

a cutter wheel mounted on said cutter wheel housing and extending therefrom for cutting a workpiece;

a shaft;

means for connecting one end of said shaft to said spindle for rotating said shaft responsive to spindle rotation;

means for placing said spindle in an unlocked condition when said spindle is engaged with said machining device; and means for translating shaft rotation to cutter wheel rotation operatively disposed between said shaft and said cutter wheel.

7. The tool of claim 6 wherein said means for placing said spindle in an unlocked condition comprises key and slot means disposed between said spindle and said housing and means for disengaging said key and slot means.

8. A tool for cutting a keyslot in a workpiece bore for use with an automatic machining device of the type having a plurality of tools for performing a number of machining operations on a workpiece, said apparatus comprising:
- a spindle rotatable about the longitudinal axis thereof and being engageable with said machining device for so rotating said spindle;
- a housing for said spindle, said spindle having an unlocked condition in which it is rotatable about the longitudinal axis thereof relative to said housing and a locked condition in which it is not rotatable;
- a cutter wheel housing;
- a cutter wheel mounted on said cutter wheel housing and extending therefrom for cutting a workpiece;
- a shaft;
- means for connecting one end of said shaft to said spindle for rotating said shaft responsive to spindle rotation;
- means for placing said spindle in a locking condition when said spindle is disengaged from said machining device; and
- means for translating shaft rotation to cutter wheel rotation operatively disposed between said shaft and said cutter wheel.

9. The tool of claim 8 wherein said means for placing said spindle in a locked condition comprises key and slot means disposed between said spindle and said housing and means for engaging said key and slot means.

10. A tool for cutting a keyslot in a workpiece bore for use with an automatic machining device of the type having a plurality of tools for performing a number of machining operations on a workpiece, said apparatus comprising:
- a spindle rotatable about the longitudinal axis thereof and being engageable with said machining device for so rotating said spindle;
- a housing for said spindle, said spindle having an unlocked condition in which it is rotatable about the longitudinal axis thereof relative to said housing and a locked condition in which it is not rotatable;
- a cutter wheel housing;
- a cutter wheel mounted on said cutter wheel housing and extending therefrom for cutting a workpiece;
- a shaft;
- means for connecting one end of said shaft to said spindle for rotating said shaft responsive to spindle rotation;
- means for translating shaft rotation to cutter wheel rotation operatively disposed between said shaft and said cutter wheel;
- bearing means disposed between said spindle and said housing;
- means for circulating coolant to said cutter wheel; and
- means for sealing said coolant from said bearing means.

11. A tool for cutting a keyslot in a workpiece bore for use with an automatic machining device of the type having a plurality of tools for performing a number of machining operations on a workpiece, said apparatus comprising:
- a spindle rotatable about the longitudinal axis thereof and being engageable with said machining device for so rotating said spindle;
- a housing for said spindle, said spindle having an unlocked condition in which it is rotatable about the longitudinal axis thereof relative to said housing and a locked condition in which it is not rotatable;
- a cutter wheel housing;
- a cutter wheel mounted on said cutter wheel housing and extending therefrom for cutting a workpiece;
- a shaft;
- means for connecting one end of said shaft to said spindle for rotating said shaft responsive to spindle rotation;
- means for translating shaft rotation to cutter wheel rotation operatively disposed between said shaft and said cutter wheel; and
- spacer means fixable to said spindle and disposed between said housing and said spindle.

12. A tool for cutting a keyslot in a workpiece bore comprising:
- an elongate spindle having a driven end and an opposed driving end and being rotatable about the longitudinal axis thereof;
- a housing for said spindle, said housing having said driven end of said spindle extending from a first end of said housing to permit connecting the same to a source of rotary motion;
- a shaft connected to the driving end of said spindle for rotating said shaft responsive to spindle rotation, said shaft extending from a second end of said spindle housing opposite said spindle housing first end;
- a shaft housing mounted on said spindle housing second end and having said shaft journaled for rotation therein;
- a cutter wheel mounted on said shaft housing;
- means for translating shaft rotation to cutter wheel rotation operatively disposed between said shaft and said cutter wheel; and
- means for selecting a cutting plane of said cutting wheel relative to said spindle housing.

13. The tool of claim 12 wherein said selecting means comprises means for varying the relative positions of said cutter wheel housing and said spindle housing.

14. The tool of claim 13 wherein said housing includes a substantially cylindrical opening to accommodate said spindle and said varying means comprises a nose cap mountable on one end of said housing and having an opening therethrough to accommodate said cutter wheel housing.

15. The tool of claim 14 wherein said nose cap opening is eccentric relative to said spindle housing opening.

16. The tool of claim 15 wherein said nose cap is rotatable relative to said spindle housing and said apparatus further includes means for fixing the same at a plurality of different angular positions.

17. A tool for cutting a keyslot in a workpiece bore comprising:
- an elongated spindle having a driven end and an opposed driving end and being rotatable about the longitudinal axis thereof;
- a housing for said spindle, said housing having said driven end of said spindle extending from a first end of said housing to permit connecting the same to a source of rotary motion;
- a shaft connected to the driving end of said spindle for rotating said shaft responsive to spindle rotation, said shaft extending from a second end of said spindle housing opposite said spindle housing first end;

a shaft housing mounted on said spindle housing second end and having said shaft journaled for rotation therein;

a cutter wheel mounted on said shaft housing;

means for translating shaft rotation to cutter wheel rotation operatively disposed between said shaft and said cutter wheel; and means for placing said spindle in a locked condition wherein said spindle is disengaged from said machining device.

18. The tool of claim 17 wherein said tool further includes means for placing said spindle in an unlocked condition when said spindle is engaged with said machining device.

19. The tool of claim 18 wherein said means for placing said spindle in an unlocked condition comprises key and slot means disposed between said spindle and said housing and means for disengaging said key and slot means.

20. The toll of claim 17 wherein said means for placing said spindle in a locked condition comprises key and slot means disposed between said spindle and said housing and means for engaging said key and slot means.

21. A tool for cutting a keyslot in a workpiece bore comprising:

an elongate spindle having a driven end and an opposed driving end and being rotatable about the longitudinal axis thereof;

a housing for said spindle, said housing having said driven end of said spindle extending from a first end of said housing to permit connecting the same to a source of rotary motion;

a shaft connected to the driving end of said spindle for rotating said shaft responsive to a spindle rotation, said shaft extending from a second end of said spindle housing opposite said spindle housing first end;

a shaft housing mounted onsaid spindle housing second end and having said shaft journaled for rotation therein;

a cutter wheel mounted on said shaft housing;

means for translating shaft rotation to cutter wheel rotation operatively disposed between said shaft and said cutter wheel; and spacer means fixable to said spindle and disposed between said housing and said spindle.

22. A tool for cutting a keyslot in a workpiece bore comprising:

an elongate spindle having a driven end and an opposed driving end being rotatable about the longitudinal axis thereof;

a housing for said spindle, said housing having said driven end of said spindle extending from a first end of said housing to permit connecting the same to a source of rotary motion;

a shaft connected to the driving end of said spindle for rotating said shaft responsive to spindle rotation, said shaft extending from a second end of said spindle housing opposite said spindle housing first end;

a shaft housing mounted on said spindle housing second end and having said shaft journaled for rotation therein;

a cutter wheel mounted on said shaft housing;

means for translating shaft rotation to cutter wheel rotation operatively disposed between said shaft and said cutter wheel;

means for circulating coolant to said cutter wheel; and means for sealing said coolant from said bearing means.

23. A tool for cutting a keyslot in a workpiece bore comprising:

an elongate shaft housing for supporting a rotatable shaft herein;

a shaft supported in said housing along an axis eccentric relative to said shaft housing axis;

a cutter wheel rotatably mounted on said shaft housing;

means for translating shaft rotation to cutter wheel rotation, said translating means being disposed between said shaft and said cutter wheel;

a spindle housing having a substantially cylindrical bore therethrough;

a spindle axially and rotatably disposed within said spindle housing bore;

means for coaxially connecting said shaft and said spindle for rotation said shaft responsive to spindle rotation;

means for selecting a cutting plane of said cutting wheel relative to said spindle housing; and a substantially cylindrical nose cap coaxially mountable on one end of said spindle housing and having an eccentric bore therein for receiving said shaft housing therethrough when said shaft is coaxially connected to said spindle and said nose cap is coaxially mounted on one end of said spindle housing.

24. A tool according to claim 23 wherein said selecting means comprises means for changing the relative angular positions of said nose cap and said spindle housing when said cap is mounted thereon.

25. A tool according to claim 23 wherein said tool further includes:

means for locking said spindle against rotation relative to said housing; and means for unlocking said spindle to allow rotation about the longitudinal axis thereof relative to said housing.

26. A tool according to claim 25 wherein said tool further includes key and slot means disposed between said spindle and said spindle housing for preventing relative movement between said spindle and said spindle housing.

27. A tool for cutting a keyslot in a workpiece bore comprising:

an elongated shaft housing for supporting a rotatable shaft therein;

a shaft supported in said housing along an axis eccentric relative to said shaft housing axis;

a cutter wheel rotatably mounted on said shaft housing;

means for translating shaft rotation to cutter wheel rotation, said translating means being disposed between said shaft and said cutter wheel;

a spindle housing having a substantially cylindrical bore therethrough;

a spindle coaxially and rotatably disposed within said spindle housing bore;

means for locking said spindle relative to said spindle housing;

means for coaxially connecting said shaft and said spindle for rotating said shaft responsive to spindle rotation; and a substantially cylindrical nose cap coaxially mountable on one end of said spindle housing and having an eccentric bore therein for receiving said shaft housing therethrough when said shaft is coaxially connected to said spindle and said nose cap is coaxially mounted on one end of said spindle housing.

* * * * *

UNITED STATES PATENT AND TRADEMARK OFFICE
CERTIFICATE OF CORRECTION

PATENT NO. : 4,923,342

DATED : May 8, 1990

INVENTOR(S) : Harold D. Kopkie et al.

It is certified that error appears in the above-identified patent and that said Letters Patent is hereby corrected as shown below:

Column 9,    line 18, change "locking" to --locked--;

Column 10,   line 56, change "elongated" to --elongate--;

Column 11,   line 9, change "wherein" to --when--;

line 38, change "onsaid" to --on said--;

line 49, between "end" and "being" insert --and--;

Column 12,   line 6, change "herein" to --therein--;

line 16, change "axially" to --coaxially--;

line 19, change "for rotation said" to --for rotating said--;

line 45, change "elongated" to --elongate--.

Signed and Sealed this

Sixth Day of August, 1991

*Attest:*

HARRY F. MANBECK, JR.

*Attesting Officer*   *Commissioner of Patents and Trademarks*